Aug. 24, 1937.   F. J. ZAPP ET AL   2,091,174
SIGNAL DEVICE AND SYSTEM
Filed April 15, 1936   2 Sheets-Sheet 1
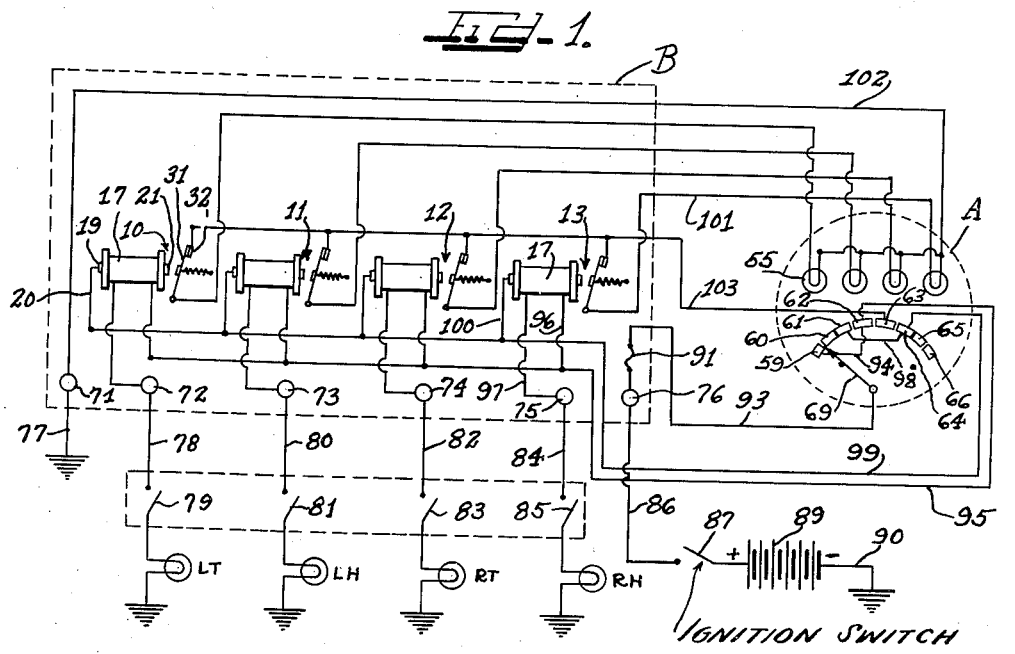
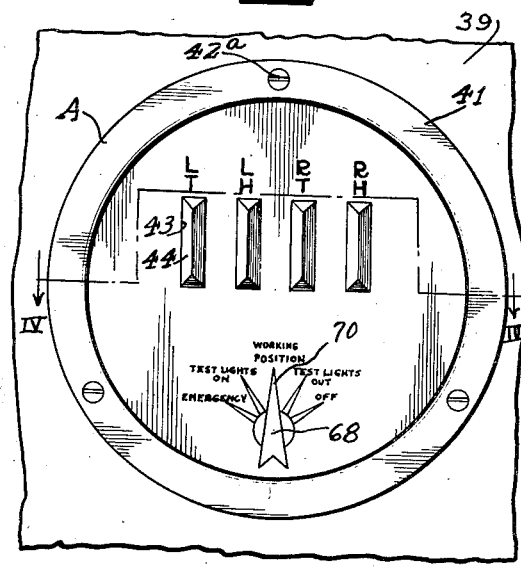
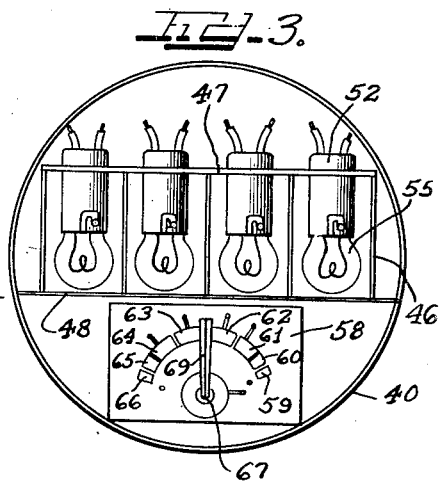
Inventors
Frank J. Zapp.
Maurice H. Weinstein.
by Charles Gowell Attys.

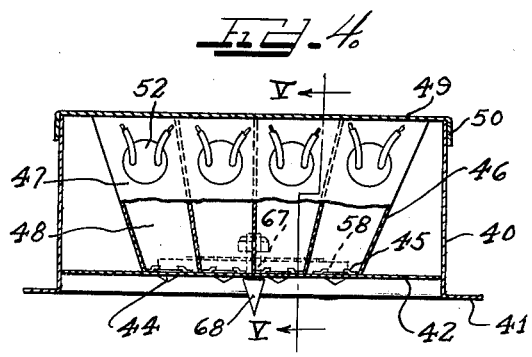
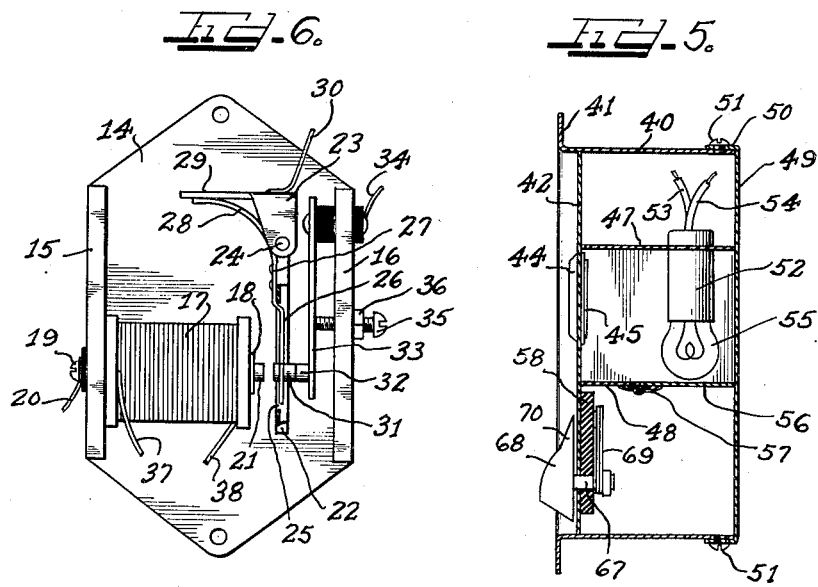

Patented Aug. 24, 1937

2,091,174

UNITED STATES PATENT OFFICE 2,091,174

SIGNAL DEVICE AND SYSTEM

Frank J. Zapp and Maurice H. Weinstein, Chicago, Ill.

Application April 15, 1936, Serial No. 74,412

1 Claim. (Cl. 177—311)

The present invention relates in general to improvements in a signal system, and more specifically to signal devices whereby the improved system may be practised.

The signal system described herein is especially useful in connection with the lighting circuits of a vehicle, such as an automobile, for positively indicating to the operator the condition of the respective circuits. For example, the use of the herein described system will enable the operator to know whether the head lights, tail lights, etc., are in proper working order, and will instantly indicate to the operator the burning out of a head light bulb, tail light bulb or other bulb in the system. Moreover, if the circuit of one of these bulbs should become opened for some reason, or otherwise inoperative, such condition will at once be indicated to the operator of the vehicle.

Signal systems for this general purpose have heretofore been utilized, but these systems have been unreliable due to the lack of proper means for conveniently and readily testing the signal system. In other words, for a signal system to give a reliable indication, the signal system itself must be in perfect condition.

With this in mind, the present invention seeks to provide a signal system wherein the different lighting circuits may be readily tested, as well as the signal circuits and devices, whenever desired.

A further object is to provide an improved signal system for automobiles and the like, wherein the signal system may be tested irrespective of whether the lighting circuits of the vehicle are "on" or "off".

As an additional feature of the invention, it is proposed to provide a signal system which may be readily connected or disconnected relative to the lighting circuits, whereby the lighting circuits may be selectively operated in the usual manner or with the signal system in operation, as desired.

A further object is to provide an improved indicating instrument and a remotely located selector of such construction as to facilitate the use of the present system in a vehicle, such as an automobile.

It is still another object to provide an improved relay of such construction as to be particularly adapted for a signal system such as described herein.

Other objects and features of the invention will more fully appear from the following detailed description, taken in connection with the accompanying drawings, which illustrate a single embodiment thereof, and in which:

Figure 1 is a view schematically showing the electrical connections of the signal system of the present invention;

Figure 2 is a view in elevation of the indicator station mounted on the dash of a vehicle, and also showing the switch for use in testing the system;

Figure 3 is a back view of the indicator station, the back of the housing being removed to show the relative locations of the operatively associated parts therein;

Figure 4 is a sectional view through the indicator housing, certain of the parts being cut away, taken substantially on the line IV—IV of Figure 2;

Figure 5 is a sectional view through the housing of the indicator, taken substantially on the line V—V of Figure 4; and Figure 6 is a plan view of one of the relays of the remotely located selector station.

As shown on the drawings:

In Figure 1 of the drawings, there is schematically represented the system of the present invention.

In general, the system comprises an indicator station which is mounted in a casing A represented by dotted lines, and a selector station, the parts of which are mounted in a casing, as shown by dotted lines at B. When the system is installed in connection with the main lights of a vehicle, such as an automobile, these lights being respectively indicated as L. T., L. H., R. T., R. H., for left tail light, left head light, right tail light, and right head light, the indicator station would be mounted on the dash of the automobile or on some other conspicuous location where it might easily be seen by the operator. The selector station might be mounted in any suitable remote location.

The selector station comprises a plurality of selector relays, generally indicated at 10, 11, 12 and 13, the details of which are specifically shown in Figure 6. Each of the relays comprises a supporting frame part 14 which is in the form of a plate having laterally turned up edges 15 and 16. An operating coil 17, which is wound on a metallic core 18, is insulatingly supported on the edge 15 of the framework by means of a screw 19 which is insulated relative to the frame and threadedly engages the metal core 18. This screw serves as a terminal connection for a conductor 20 whereby an electrical circuit may be established from the conductor 20 to the screw 19, and from the core 18 to a stationary contact 21 which is mounted at the opposite end of the core from its point of securement.

Operatively associated with the core 18 is an armature member 22 which is pivotally mounted at one end on a bracket 23 by means of a pivot member 24. The armature 22 is provided with a longitudinal slot 25 within which there is disposed a spring member 26, this member being anchored at its inner end to the armature, as shown at 27, and continued in an arcuate extension 28 to form a leaf spring having its free end in engagement with a projecting arm 29 of the bracket 23. Connected to the bracket 23 is a conductor 30, by means of which electrical connection may be established through the bracket, spring and armature to a double contact 31 at the free end of the spring, and in such position that, when the armature is attracted due to the energization of the coil 17, this contact will engage the contact 21 at the end of the core 18. In attracted position, the spring 28 opposes the action of the coil so that when the coil 17 is deenergized, the spring 28 will force the armature away from the coil and disengage the contact 21.

In the de-energized condition of the coil, the contact 31 of the armature engages a contact 32 which is supported on the outer end of a contact spring 33 which has its opposite end insulatingly supported on the frame edge 16. Connection is made to the contact spring 33 by means of a conductor 34. Adjustment of the contact 32, whereby the contact may be moved toward or away from the armature contact, is accomplished by means of an adjusting screw 35 which is threadedly mounted for longitudinal movement in the edge 16 of the frame. The inner end of the screw 35 bears against the contact spring 33. The adjusting screw 35 may be locked or secured in adjusted position by means of a suitable lock nut 36 thereon, simply by actuating the nut into tight engagement with the side edge 16 of the frame.

Connections to the operating coil of the relay are indicated at 37 and 38.

The indicator station is shown in Figure 2 as being mounted on the vehicle dash, as indicated at 39, and comprises, in this instance, a circular casing or housing 40 which is outwardly deflected at one end to form a right-angular peripheral flange 41 which is adapted to abut the surface of the dash and be secured in position by means of securing screws 42a. The forward wall of the housing is formed by a circular member 42 which is provided with a plurality of aligned rectangular openings 43 which form windows and have disposed therein, in each case, a lens 44 of glass or other suitable material. The lenses are secured by means of small lateral strips 45 which are secured along one edge to the front wall 42 and having their other edge overlapping the rear surface of each lens.

Extending rearwardly and supported from the front wall 42 are a plurality of divergent partition members 46 having their upper edges connected to a top member 47, and their lower edges to a bottom member 48, to define a plurality of compartments each having a lens 44 at the forward portion thereof. The rear end of the casing 40 is closed by a back plate 49 which is provided with a peripheral flange 50 adapted to extend over the rear end of the housing and be secured against removal by means of screws 51.

In each compartment and near the rear of the top member 47, there is supported a lamp socket 52 to which electrical connection is made through conductors 53 and 54. Each socket is adapted to have mounted therein a suitable electric light bulb 55. In order to facilitate putting the bulbs in the sockets, the bottom member 48 is provided with a hinged section 56 which is normally actuated to closed position by means of a spring 57, one end of which is in engagement with the stationary portion of the bottom plate and the other end with the movable portion or hinged section of the bottom plate.

In the space within the housing, below the bottom plate 48, there is disposed a switch for use in testing the signal system. Mounted upon a plate 58 of insulating material are a plurality of arcuate segments arranged in end-to-end spaced relationship, these segments being respectively indicated by numerals 59, 60, 61, 62, 63, 64, 65 and 66. A shaft 67 is rotatably mounted in the plate 58, the forward end of this shaft projecting past the forward surface of the wall 42, and the rear end of the shaft projecting past the rear surface of the plate 58. A digitally operable button 68 is secured to the forward end of the shaft for imparting rotative movement to the shaft. A movable contact arm 69 is secured to the rear end of the shaft for movement therewith. The outer end of this arm extends over and is arranged to engage the segments forming the stationary contacts during movement of the arm. The arm 69 is V-shaped so as to provide a beveled edge for engagement with the contacts.

It will therefore be evident that, as the arm is moved over the stationary contacts, the beveled edge will snap into the space between the ends of adjacent contacts and form a connection between these segments. The button 68 is provided with a portion 70 forming a pointed projection.

As shown in Figure 2, the forward surface of the insert 42 is provided with suitable indicia which are traversed by the pointed portion 70 of the button 68 for indicating the respective positions of the switch arm 69 as it traverses the stationary contacts and comes to rest between adjacent contacts. It will be noted that the spaces between the contacts 64—65 and contacts 60—61 are filled with an insulating material so that the contact arm will pass over the space between these contacts without coming to a rest. The purpose of this will be explained subsequently.

Referring to Figure 1, it will be noted that the selector unit is provided with a plurality of terminals 71, 72, 73, 74, 75 and 76. The terminal 71 is connected through a conductor 77 to ground. The terminal 72 is connected through a conductor 78 to the left tail light, this conductor having a switch 79 therein for controlling the left tail light. The other side of the tail light is connected to ground. The terminal 73 is connected through a conductor 80 to the left head light, this conductor having a switch 81 therein for controlling the head light. The other side of the head light is grounded.

The terminal 74 is connected through a conductor 82 to the right tail light, this conductor having a control switch 83 therein. The other side of the right tail light is grounded. The terminal 75 is connected through a conductor 84 to the right head light, this conductor having a control switch 85 therein. The other side of the right head light is grounded. The terminal 76 has connected thereto a conductor 86 which is connected through an ignition switch 87 to the positive side of the vehicle battery 89. The negative side of the battery is grounded through a conductor 90.

Referring to Figure 2, it will be noted that the switch operating button 68 may be positioned to give the following conditions of operation of the signal system: "emergency"; "test lights on"; "working position"; "test lights out", and "off". The operation of the signal system for each of these conditions will now be discussed.

*"Emergency"*.—With the switch button 68 on the "emergency" position, the switch arm 69 will interconnect segments 59 and 60. With the ignition switch 87 closed, the vehicle lights may be operated in the usual manner by opening and closing their individual switches 79, 81, 83 and 85. For example, let us consider the right head light. The circuit for this light, when the switch button is on the "emergency" position, will be from the positive side of the battery 89 to the switch 87, conductor 86 to terminal 76, through fuse 91, conductor 93 to switch arm 69, through segment 59, through conductor 94 to segment 62, thence through conductor 95 to branch connection 96, through the operating coil 17 of relay 13, conductor 97 to terminal 75, conductor 84, switch 85 to right head light, through ground connection to conductor 90 and the negative side of the battery 89. It will be noted that the relay in circuit with the light which is being turned on and off will be energized, but that this will not affect the signal light for the reason that the contacts of the relay are connected to conductors which are open-circuited.

It will therefore be evident that on the "emergency" connection, the main lights may be operated without any indication by the signal lights.

*"Test lights on"*.—The purpose of this position of the switch is to enable testing of the signal lights when the main lights are on or burning. On this position of the switch, the switch arm 69 will interconnect segments 61 and 62. If the switches 79, 81, 83 and 85 are all closed, all the lights will be burning and the respective relays 10, 11, 12 and 13 will all be energized. For illustrating the operation, it is thought that it will be sufficient to describe the test in connection with one of the lights, for example, the right head light.

The right head light and the relay would be energized through the following circuit: from the positive side of the battery 89, through ignition switch 87, conductor 86 to terminal 76, through fuse 91, conductor 93, switch arm 69, to segments 61 and 62, from segment 62 through conductor 95, conductor 96, to one side of the coil 17, from the other side of the coil, through conductor 97 to terminal 75, through conductor 84, switch 85 to right head light, and thence to ground and back to the negative side of the battery through conductor 99. The energization of the relay coil 17 will cause the armature to be attracted and close the contacts 21 and 31. This will complete a circuit through the signal light corresponding to the right head light, this circuit being as follows: from battery 89, through ignition switch 87, conductor 86, to terminal 76, through fuse 91, conductor 93, switch arm 69, to segments 61 and 62, from segment 61 through conductor 98 to segment 64, thence through conductor 99, conductor 100, the core of the operating coil of the relay 13, to contact 21, contact 31, through the armature to conductor 101 to the signal light corresponding to the right head light, and thence through conductor 102 to terminal 71, through conductor 77 to ground and back through conductor 90 to the negative side of the battery 89.

Since each relay and its signal light is in parallel with the other relays and their respective lights, it is apparent that all the signal lights will be lighted when the switch arm is on the "test lights on" position, thus advising the operator that the respective relays and signal lights are in proper operating condition.

*"Working position"*.—This is the position in which the switch would ordinarily be set when it is desired for the indicating lights to indicate when one of the main lights burns out or its circuit, for some reason, becomes opened. When the pointer of the button 68 is set on "working position", the switch arm 69 is between segments 62 and 63 and makes connection therewith. For descriptive purposes, it will be assumed that the right head light is burning, and that it is desired to utilize the signal light for that main light as an indication of the condition of the right head light and its circuit.

With the right head light burning, the coil of the relay 13 will be energized and the circuit through the coil and the right head light will be as follows: from the positive side of battery 89, through ignition switch 87, conductor 86, to terminal 76, through fuse 91, conductor 93, switch arm 69, to segments 62 and 63, from segment 62 through conductor 95, conductor 96, coil 17, conductor 97 to terminal 75, conductor 84, switch 85 to one side of the right head light, from the other side of the right head light to ground, and thence back through conductor 99 to the negative side of the battery 89. So long as the right head light is burning, in which case the coil 17 is energized, the armature of the coil 17 will be attracted and contacts 31 and 32 will be opened. As soon as the circuit through the operating coil of the relay 13 and the right head light is opened, for any reason, the coil 17 of this relay is de-energized with the result that the armature is moved by the biasing spring so that the contacts 31 and 32 become engaged. Engagement of these contacts completes the circuit to light the signal light for indicating the condition of the right head light.

The circuit is as follows: from the positive side of battery 89, through ignition switch 87, conductor 86, to terminal 76, through fuse 91, conductor 93, switch arm 69, to segments 62 and 63, from segment 63, through conductor 103, to contact 32 of relay 13, through the armature of relay 13, through conductor 101 to the signal light, and thence through conductor 102 to terminal 71, conductor 77 to ground, and back through conductor 90 to the negative side of the battery 89. The signal light will therefore indicate that the right head light is out or that its circuit is, for some reason, open. As soon as the circuit of the right head light is again put in operation, the relay 13 will attract its armature and open contacts 31 and 32, whereupon the associated signal light will be extinguished.

*"Test lights out"*.—This position of the switch is for testing when the main lights are not burning. When the main lights are not burning, the switches 79, 81, 83 and 85 are all open. The signal lights will all be lighted, as, for example, the right head light signal will light, being energized through the following circuit: from the positive side of the battery 89, through ignition switch 87, conductor 86, to terminal 76, through fuse 91, conductor 93, switch arm 69, to segments 63 and 64, from segment 63, through conductor 103 to contact 32, contact 31, conductor 101 through one side of the right head light indicating lamp, from the other side of this lamp through conductor 102, to terminal 71, conductor 77 to ground, from ground to conductor 90, and thence back to the negative side of the battery 89.

"*Off*".—In this position of the switch, the contact arm is disposed in such a position as to connect the segments 65 and 66, but since there are no conductors leading from these segments and since the segment 65 is insulated relative to the segment 64, the battery is entirely disconnected from the signal and main light circuits. Under these conditions, the signal system as well as the main light circuits are rendered inoperative.

From the foregoing description, it will be apparent that the present invention provides an improved signal device and system for indicating the condition of the main lighting circuits of a vehicle; in which the different lighting circuits may be readily and conveniently tested, irrespective of whether the main lights are on or off; a signal system which may readily be disconnected so that the main lighting circuits may be operated in the usual manner; and which embodies improved indicator and selector stations.

It is, of course, to be understood that although we have described in detail a single embodiment of our invention, the invention is not to be thus limited, but only insofar as defined by the scope and spirit of the appended claim.

We claim as our invention:

In a lighting system for a vehicle, a power circuit; a plurality of main lights; a remotely located station comprising a plurality of selector relays having operating coils respectively connected in series with said main lights to define a plurality of parallel main light circuits each connected at one end to one side of the power circuit and at the other end to a common conductor, each of said relays having a movable contact arranged to engage a first stationary contact when the relay operating coil is energized and engage a second stationary contact when the relay coil is de-energized; and a local indicator and control station adapted to be disposed on the dash of the vehicle, said latter station comprising a plurality of signal circuits connected at one set of ends to the same side of the power circuit as the main light circuits and at their other ends respectively to the movable contacts of the relays, a signal light in each signal circuit, and a selector switch operable to connect the other side of said power circuit (A) to said common conductor (B) to said common conductor and said first stationary contacts of the relays (C) to said common conductor and said second stationary contacts of the relays and (D) to both said first and second stationary contacts of the relays.

FRANK J. ZAPP.
MAURICE H. WEINSTEIN.